United States Patent [19]

Hashimoto et al.

[11] Patent Number: 5,075,353
[45] Date of Patent: Dec. 24, 1991

[54] FIBER-REINFORCED THERMOSETTING RESIN MOLDING MATERIAL AND METHOD FOR PRODUCTION THEREOF

[75] Inventors: Terukuni Hashimoto, Hyogo; Hideo Nakanishi, Osaka; Shigehiro Yamamoto, Osaka; Toshio Iga, Osaka, all of Japan

[73] Assignee: Nippon Shokubai Kagaku Kogyo Co., Ltd., Osaka, Japan

[21] Appl. No.: 269,178
[22] PCT Filed: Feb. 23, 1987
[86] PCT No.: PCT/JP87/00114
§ 371 Date: Dec. 12, 1988
§ 102(e) Date: Dec. 12, 1988
[87] PCT Pub. No.: WO88/06166
PCT Pub. Date: Aug. 25, 1988
[51] Int. Cl.$^5$ ............................................. C08K 9/00
[52] U.S. Cl. .................................. 523/209; 523/513; 523/527; 106/489; 65/3.43; 65/4.30
[58] Field of Search ................. 523/513, 527, 209; 106/489; 65/3.43, 4.30

[56] References Cited

U.S. PATENT DOCUMENTS

| 3,576,782 | 4/1971 | Molbert et al. | 260/41 |
| 3,924,047 | 12/1975 | Ward et al. | 428/378 |
| 3,932,980 | 1/1976 | Mitzutani et al. | 53/111 |
| 4,211,686 | 7/1980 | Nishikawa et al. | 523/513 |
| 4,410,645 | 10/1983 | Das et al. | 523/206 |
| 4,585,824 | 4/1986 | Uchida et al. | 524/494 |
| 4,727,096 | 2/1988 | Choudin | 523/527 |

FOREIGN PATENT DOCUMENTS

| 3515483 | 4/1986 | Fed. Rep. of Germany . |
| 49-124165 | 11/1974 | Japan . |
| 52-2838 | 10/1977 | Japan . |
| 53-140375 | 12/1978 | Japan . |
| 56-152820 | 11/1981 | Japan . |
| 57-41918 | 3/1982 | Japan . |
| 1385760 | 10/1972 | United Kingdom . |

OTHER PUBLICATIONS

Loewenstein, K. L., "The Manufacturing Technology of Continuous Glass Fibres", Elsevier Sci. Publishing Co., New York 1973 (pp. 24,25 & 26).

Primary Examiner—Paul R. Michl
Assistant Examiner—U. K. Rajguru
Attorney, Agent, or Firm—Omri M. Behr,

[57] ABSTRACT

This invention relates to a molding material composed of a liquid thermosetting resin composition containing styrene monomer as a cross-linking component thereof and chopped glass fiber strands which can give a large molded product having high impact strength in high productivity and a method for manufacture thereof characterized by using glass fiber strands such that the number of glass filaments used in the glass fiber strands falls in the range of 600 to 1,400 per strand, the amount of a binder deposited on the glass fibers is not less than 1.0% by weight, and the percentage of styrene monomer insoluble binder falls in the range of 40 to 90% by weight.

12 Claims, No Drawings

FIBER-REINFORCED THERMOSETTING RESIN MOLDING MATERIAL AND METHOD FOR PRODUCTION THEREOF

TECHNICAL FIELD

This invention relates to a fiber-reinforced thermosetting resin molding material and to a method for the production thereof. More particularly, it relates to a molding material which is obtained by mixing chopped glass fiber strands with a thermosetting resin composition such as unsaturated polyester resin or vinyl ester resin thereby impregnating the glass fibers with the resin composition and is used for molding a product by being molded under application of heat and pressure with an injection molding machine or a transfer molding machine and to a method for the production of the molding material.

BACKGROUND ART

Generally, compression molded articles using a sheet molding compound (hereinafter referred to as "SMC" for short) as the molding material enjoy high strength and rigidity and yet suffer from deficiency in surface property and production cycle. In contrast, injection molded articles using a bulk molding compound (hereinafter referred to as "BMC" for short) exhibit satisfactory surface property and enjoy a short production cycle and yet suffer from deficiency in mechanical strength. Although the injection molding method using the BMC has long been in practice, the products thereof are mostly small molded articles represented by electrical parts. It is rarely employed for the production of large shaped articles solely because the products thereof are deficient in properties of strength, particularly impact strength.

The BMC to be used for injection molding has heretofore been produced by causing chopped glass fiber strands to be impregnated with an unsaturated polyester resin composition by the use of a kneading machine such as a twin-arm kneader, for example. Since the glass fiber strands are opened, bent, and injured by the mechanical shearing force exerted thereon during the course of manufacture of BMC, the BMC, even in the compression molded form, in which the glass fiber strands are not damaged further in the course of molding, has only about one half of the impact strength of the SMC at most. Further, even during the course of injection or transfer molding, comprising the steps of feeding the BMC to a stuffer, forcing it into a plunger or a screw, conveying, metering, and injecting a compressed mass of the BMC, advancing this mass of the BMC through the interior of a die, and curing the discharged the BMC mass, the glass fiber strands in the BMC are conspicuously opened and bent and injured all the more by the mechanical force exerted on the BMC. The finished products obtained by injection or transfer molding the BMC, therefore, have very low degree of impact strength, even below one fourth of those of the products obtained by compression molding the SMC.

Various devices have been heretofore invented such as for shortening the time of blending as by optimizing the blending machine, for example (U.S. Pat. No. 3,932,980), for repressing the susceptibility of glass fiber strands to the detrimental phenomena of opening and injuring as by selecting the kind of a binder for glass fibers or regulating the amount of the binder applied thereto, for rendering chopped glass fibers difficult to break or intertwine as by decreasing the length thereof to the neighborhood of ¼ inch (Japanese patent Laid-Open SHO 57(1982)-41,918), and for preventing glass fibers from being damaged owing to mutual friction by keeping the glass fiber content in the BMC below the level of 20% by weight. They, however, have failed to bring about any appreciable improvement.

An object of this invention, therefore, is to provide a novel fiber-reinforced thermosetting resin molding material and a method for the production thereof.

Another object of this invention is to provide a fiber-reinforced thermosetting resin molding material which retains the advantages such as outstanding surface properties and productivity owned by the conventional BMC, shows great improvements in mechanical properties, particularly in impact strength, and permits production of medium to large shaped articles of high practical value and a method for the production thereof.

DISCLOSURE OF THE INVENTION

The objects described above are attained by a molding material comprising a liquid thermosetting resin composition containing styrene monomer as a cross-linking component and chopped glass fiber strands and intended for molding by being forced into the interior of a die by the use of a plunger or screw mechanism and compressed therein at elevated temperatures, which fiber-reinforced thermosetting resin molding material is characterized by using chopped glass fiber strands such that the glass fiber strands each comprise 600 to 1,400 glass filament, the amount of a binder deposited on the glass fibers is not less than 1.0% by weight, and the percentage of a styrene-monomer insoluble binder falls in the range of 40 to 90% by weight.

The objects mentioned above are also attained by a method for the production of a fiber-reinforced thermosetting resin molding material intended for molding by being forced into the interior of a die by the use of a plunger or screw mechanism and compressed therein at elevated temperatures, which method is characterized by mixing a liquid thermosetting resin composition containing styrene monomer as a cross-linking component with chopped glass fiber strands such that the glass fiber strands each comprise 600 to 1,400 glass fibers, the amount of a binder deposited on the glass fibers is not less than 1.0% by weight, and the percentage of a styrene monomer insoluble binder falls in the range of 40 to 90% by weight.

BEST MODE FOR CARRYING OUT THE INVENTION

In the present invention, the individual glass filaments of which the glass fiber strands are formed may have a diameter selected in the heretofore generally accepted range of about 8 to 13 $\mu$m to suit the particular use for which the produced molding material is intended. In the case of two diameters, 11 $\mu$m and 13 $\mu$m, the molding material using strands of glass filaments 13 $\mu$m in diameter has a material strength (strength of the compression molded product of the molding material) about 6% higher than the molding material using strands of glass fiber 11 $\mu$m in diameter. The injection or transfer molded product of the molding material incorporating therein glass filaments of the larger diameter 13 $\mu$m have the same level of strength as the molding material using glass filaments of the smaller diameter 11 $\mu$m.

The present invention does not particularly discriminate the chopped glass fiber strands by their length. Generally, the length is in the range of 6 to 25 mm. From the standpoint of the strength to be acquired by the molded product, the optimum length of the chopped glass fiber strands is in the range of 12 to 18 mm. Longer chopped glass fibers exceeding 25 mm are undesirable because the molding material using these glass fibers, depending on the capacity of a molding machine being used for injection or transfer molding, cannot be smoothly metered and conveyed during the course of the injection or transfer molding.

The content of chopped glass fiber strands in the molding material is required to be not less than 15% by weight and desired to be as large as possible for the purpose of conferring upon the injection or transfer molded product of the strength which proves desirable from the practical point of view. If the content exceeds 30% by weight, however, the frequency of individual chopped glass fiber strands undergoing such detrimental phenomena as mutual friction and intertwist increases to the extent of rather lowering than heightening the strength of the finally molded product and impairing the surface properties of the molded product. All considered, therefore, the optimum content of the glass fibers is in the range of 15 to 25% by weight.

As concerns the number of glass filament used in the strands, fiber strands each composed of a large number, generally in the range of 1,600 to 4,000, of filament are used where the molding material is molded by such a method as pultrusion or filament winding which requires uniform tension to be exerted on the fiber strands during the course of molding. In the case of such a molding material as BMC or SMC which possesses chopped fiber strands randomly oriented these chopped fiber strands are required to be satisfactorily dispersed in and impregnated with the resin composition in due respect of such qualities of molded products as surface properties and mechanical properties. In consideration of the dispersibility and impregnability of glass filament, therefore, it has been customary for the particular molding material under discussion to use glass fiber strands each composed of only 200 to 400 glass filament. Japanese Patent Laid-Open SHO 53(1978)-140,375, for example, has a disclosure purporting that a roving glass, a strand of 400 glass filament (produced by Nitto Boseki Co., Ltd. and marketed under Product Code of "240 PA549SJ") is usable as glass fiber strands for the SMC.

The inventors have developed a theory that, concerning the method of molding such as injection or transfer molding which is liable to expose the molding material to large mechanical strength throughout the entire course of molding operation started by the feed of the molding material and terminated by the curing, use of glass fiber strands each formed of a larger number of glass filament ought to offer no hindrance to the dispersibility and impregnability of glass fibers in the molded products because the intermixture of the thermosetting resin composition with the chopped glass fiber strands takes place also in the step of molding. They have continued a study on this theory to find that when glass fiber strands each formed of 600 to 1,400, preferably 800 to 1,000, glass filaments are used, they are satisfactorily dispersed in and impregnated with the resin composition and allowed to give rise to injection or transfer molded products excelling in impact strength and surface properties. If the number of glass filaments forming a unit strand exceeds 1,400, the dispersibility and impregnability of the fiber strands with the resin composition is not sufficient and the difference in ratio of shrinkage between the portion rich in resin and the portion rich in fibers manifests itself as fiber patterns prominent on the surface of the molded product and impairs the surface smoothness thereof. If, on the other hand, the number is less than 600, the finally molded product is deficient in strength properties.

For glass fiber strands, binders of various kinds have been heretofore used. In the present invention, by selecting binder such that the percentage of styrene monomer insoluble binder is controlled in a specific range and by using glass fiber strands such that the amount of the binder to be deposited thereon is controlled, there can be obtained a molding material capable of giving rise to molded products which enjoy high strength and do not suffer fiber patterns to appear prominently on the surface and impair the appearance of the surface. The percentage of a styrene monomer insoluble binder is slightly variable with the kind of the binder. Generally, however, the strength of the molded product is high when the percentage of styrene monomer insoluble binder is rather higher than otherwise. The solubility of the binder as immersed in the styrene monomer increases with the lapse of the time of immersion. Even in the case of glass fiber strands of the type involving a large change of the solubility, this solubility reaches a level of saturated in a matter of several hours and substantially ceases to change. The SMC or BMC, for the purpose of improving the ease of handling, includes in the process of its production a step for increasing the viscosity by the use of a thickener such as, for example, magnesium oxide, magnesium hydroxide, or calcium hydroxide. As the result, the SMC or BMC acquires increased viscosity and the thermosetting resin composition permeates the glass fiber strands with increased difficulty. When the glass fiber strands are mixed with the liquid thermosetting resin composition to be impregnated therewith, therefore, for the purpose of effecting this impregnation thoroughly and obtaining a molding material capable of forming molded products excelling in surface properties and strength, the degree to which the binder is dissolved by the styrene monomer in the resin composition is desired to be such that this solution reaches a prescribed level in a relatively short span of time. If the binder is dissolved excessively, the glass fiber strands in the produced molding material are opened and separated into individual glass filaments and become susceptible to damage during the course of injection or transfer molding. Consequently, the molded products formed from the molding material acquire no satisfactory impact strength.

In the present invention, the percentage of a styrene monomer insoluble binder on the glass fiber strands is determined based on the loss of weight to be found after the glass fiber strands have been immersed for one hour in the styrene monomer. The amount of the binder to be deposited on the glass fibers is determined by the method resorting to the weight percent ignition loss on which will be fully described later on. The binder is desired to have an insoluble content in the range of 40 to 90% by weight, preferably 45 to 85% by weight. If the insoluble content is less than 40% by weight, the glass fiber strands are opened to a great extent during the course of production of the molding material and during the course of molding and the molding material consequently obtained does not acquire molded products excelling in strength. If the insoluble content exceeds 90% by weight, the glass fiber strands are not sufficiently impregnated with the liquid thermosetting resin composition during the course of the production of the molding material, consequently obtained molded products have poor surface properties and are deficient in strength.

The amount of the binder to be deposited on the glass fibers usable effectively for the molding material of this invention, though variable more or less with the kind of the binder to be used, must be not less than 1.0% by weight. Preferably, this amount is not less than 1.7% by weight and not more than 2.3% by weight, which the highest possible level at which the deposition is obtained. If the amount of the binder deposited is less than 1.0% by weight, the glass fibers, when chopped, are opened so heavily as to render their handling difficult and the molded products obtained from the molding material exhibit no high strength. Incidentally, this amount of the binder deposited on the glass fibers is determined herein, based on the weight percent ignition loss which is specified in JIS R 3420.

As the liquid thermosetting resin composition for use in the present invention, a composition obtained by mixing a radically polymerizable resin such as an unsaturated polyester resin or vinyl ester resin which assumes a liquid state at normal room temperature and contains styrene as a cross-linking monomer with additives such as filler, thickener, mold release agent, curing catalyst, coloring agent, low profile additive, and ultraviolet absorbent which are generally accepted in the art. The viscosity of the present resin composition is in the range of 100 to 10,000 poises, preferably 400 to 3,000 poises.

The term "unsaturated polyester" as used herein means a product obtained by dissolving in styrene monomer an unsaturated polyester which is a polycondensate between an acid moiety which comprises an $\alpha, \beta$-unsaturated dibasic acid such as maleic anhydride or fumaric acid and/or the anhydride of the dibasic acid and optionally a saturated polybasic acid such as phthalic anhydride, tetrahydrophthalic anhydride, tetrachlorophthalic anhydride, or succinic anhydride with a polyhydric alcohol such as ethylene glycol, diethylene glycol, propylene glycol, 1-3-butane diol, or hydrogenated bisphenol A. The term "vinyl ester resin" as used herein means a product obtained by dissolving in styrene monomer a vinyl ester resulting from the esterification with acrylic acid or methacrylic acid of a compound possessing at least two epoxy groups in the molecular unit thereof such as an epoxy resin derived from bisphenol A, bisphenol F, brominated bisphenol A, phenol novolak, brominated phenol novolak, or cresol novolak in combination with epichlorohydrin and/or 2-methyl epichlorohydrin or a modified version of the epoxy resin.

In the production of the SMC or BMC by the use of the resin composition in accordance with the method of this invention, such an inorganic substance as calcium carbonate, aluminum hydroxide, alumina, silica, clay, feldspar, river sand, or white marble can be used in a powdered form as a filler in an amount in the range of 0 to 400 parts by weight, more desirably 100 to 300 parts by weight, and most desirably 150 to 250 parts by weight, based on 100 parts by weight of the resin composition.

The resin composition to be used in the present invention may, when necessary, incorporate therein a thickener such as magnesium oxide or magnesium hydroxide, a low profile additive such as polystyrene, a silane coupling agent, a mold release agent such as zinc stearate or calcium stearate, a thixotropic agent, a plasticizer, a pigment, a coloring agent, or a flame retardant.

The resin composition thus obtained, with a radical polymerization initiator added thereto, is molded under application of heat and pressure. Examples of the radical polymerization initiator include t-butyl peroxybenzoate, benzoyl peroxide, cumene hydroperoxide, t-butyl peracetate, and 2,5-dimethylhexyl-2,5-peroxybenzoate. This polymerization initiator is incorporated in the aforementioned resin composition in an amount in the range of 0.2 to 10% by weight, preferably 0.5 to 2% by weight, based on the amount of the resin composition.

The production of the fiber-reinforced thermosetting resin molding material of the present invention by the use of the resin composition and the chopped glass fiber strands can be effected by admixing the resin composition with the chopped glass fiber strands, dispersing the chopped glass fiber strands in the resin composition to be impregnated therewith by means of a blender such as, for example, a twin arm type kneader or a cokneader by the conventional method, and optionally allowing the resulting blend to stand aging at a temperature in the range of 20° to 60° C., preferably 30° to 50° C., for a period in the range of 5 to 300 hours, preferably 10 to 100 hours.

Alternatively, the fiber-reinforced thermosetting resin molding material of the present invention can be produced by a procedure which, as described in DE 35 15 483 A1, comprises feeding the liquid thermosetting resin composition onto the surface of at least one transfer roller in motion, causing the resin composition now adhering to the aforementioned surface to be sprayed in the form of particles by means of a scattering roller separated by a gap from the transfer roller and rotated in the same direction, allowing the scattered particles of the resin composition to pile up in a state mixed with chopped glass fiber strands being separately scattered, and then deaerating the piled mass thereby allowing the resin composition to impregnate the piled mass.

The scattering roller, when brought into contact while in rotation at a high rate of speed with the resin composition being conveyed on the surface of the transfer roller, scrapes the resin composition and, at the same time, sends it flying in the form of particles. Thus, the two rollers are rotated in one and the same direction so that the relative peripheral speeds of the two rollers may be increased. For the increase of the peripheral speeds, the diameter of the scattering roller is desired to be smaller than that of the transfer roller. Further, since the transfer roller is intended to transfer the resin composition fed onto the surface thereof to the position of the scattering roller, the number of revolutions of this transfer roller is relatively small, falling generally in the range of 100 to 1,000 r.p.m, preferably 200 to 400 r.p.m. In contrast, since the scattering roller is intended to scrape and scatter the resin composition, the number of revolutions of this scattering roller is large, generally falling in the range of 3,000 to 10,000 r.p.m, preferably 5,000 to 7,000 r.p.m. Use of one scattering roller per transfer roller suffices for the purpose mentioned above.

The fiber-reinforced thermosetting resin molding material of the present invention is molded as usually practised by the injection molding method, transfer molding method, compression molding method, or extrusion molding method. It manifests its outstanding effect conspicuously when it is molded by the injection molding method or the transfer molding method.

Now, the present invention will be described more specifically below with reference to working examples.

The thermosetting resin used in the working examples was an unsaturated polyester resin (produced by Nippon Shokubai Kagaku Kogyo Co., Ltd. and marketed under trademark designation of "Epolac N-21") and the low profile additive used therein was a product of Nippon Shokubai Kagaku Kogyo Co., Ltd. and marketed under trademark designation of "Epolac AT-100"). The glass fiber strands used therein were various grades of Roving Glass produced by Nippon Glass Fibers Co., Ltd. The roving TEX of the various grades of Roving Glass was TEX2200 in Example 4, TEX2100 in Control 4, and TEX2310 in all the other examples.

The methods used in molding the molding materials obtained in the working examples were the compression molding method which was employed for the preparation of test pieces for confirmation of molding material strength and the injection molding method which was employed for the preparation of test pieces for measurement of product strength. The compression molding was carried out with a 300-ton press molding machine (product of Kawaichi Hydraulic Co., Ltd.) provided with a die designed for fabrication of a circular flat plate 325 mm in diameter and 3 mm in thickness, under the molding conditions of die temperature of 150° to 160° C., pressure of 100 Kg/cm$^2$, and curing time of 120 seconds. The injection molding was carried out by injecting a given molding material by a BMC grade injection molding machine (produced by Ishikawajima-Harima Heavy Industries Co., Ltd.; die clamping force 200 tons and injection barrel diameter 70 mm) set at a barrel temperature of 40° C. into a die for fabrication of a rectangular panel 280 mm×255 mm×3 mm (thickness) under the molding conditions of die temperature of 150° to 160° C., injection pressure of 650 Kg/cm$^2$, and curing time of 60 seconds.

EXAMPLE 1

A glass fiber-reinforced unsaturated polyester resin molding material (BMC) was obtained by mixing chopped glass fiber strands possessing the conditions of Table 1 by the procedure described in Example 1 of DE 35 15 483 Al with a resin composition prepared by combining the unsaturated polyester resin with the additives of the proportions indicated in Table 1 and allowing the glass fiber strands to be impregnated with the resin composition. From this molding material, circular flat plates were produced by the compression molding method and rectangular panels by the injection molding method. These plates and panels were tested for impact properties. The compression molded circular plates were used for determination of material strength and the injection molded rectangular panels for determination of product strength respectively. Samples collected from the plates or panels were fabricated to obtain flat notchless test pieces, which were tested with an Izod impact testing machine. The surface qualities of injection molded pieces were determined by visual inspection of the aforementioned rectangular panels. The results were as shown in Table 1. All the percents (%) shown in Table 1 invariably represent percents by weight.

EXAMPLES 2-4

Molding materials were produced by following the procedure of Example 1, except that varying chopped glass fiber strands shown in Table 1 were used. The molding materials consequently obtained were molded and tested by following the procedure of Example 1. The results were as shown in Table 1.

The rectangular panels obtained in Examples 1-3 showed absolutely no fiber patterns on their surface and possessed a highly satisfactory appearance. The rectangular panel obtained in Example 4 showed fiber patterns very slightly on the surface but possessed a satisfactory appearance.

Control 1

A molding material was produced by using a resin composition and chopped glass fiber strands shown in Table 1 and following the conventional method using a twin arm kneader. The molding material consequently obtained was molded and tested by following the procedure of Example 1. The results were as shown in Table 1.

Controls 2-4

Molding materials were produced by following the procedure of Example 1, except that varying resin compositions and chopped glass fiber bundles shown in Table 1 were used instead. When the molding materials consequently obtained were molded and tested by following the procedure of Example 1, the results were as shown in Table 1.

The rectangular panel obtained in Control 4 showed fiber patterns prominently on the surface and possessed a poor appearance.

TABLE 1

| Item | Example 1 | Example 2 | Example 3 | Example 4 | Control 1 | Control 2 | Control 3 | Control 4 |
| --- | --- | --- | --- | --- | --- | --- | --- | --- |
| Unsaturated polyester resin composition | | | | | | | | |
| Unsaturated polyester resin (Epolac N-21) (%) | 17.9 | 17.9 | 17.9 | 17.9 | 19.1 | 17.9 | 17.9 | 17.9 |
| Low profile additive (Epolac AT-100) (%) | 7.7 | 7.7 | 7.7 | 7.7 | 8.2 | 7.7 | 7.7 | 7.7 |
| Filler (calcium carbonate) (%) | 46.8 | 46.8 | 46.8 | 46.8 | 49.9 | 46.8 | 46.8 | 46.8 |
| Mold release agent (zinc stearate) (%) | 1.0 | 1.0 | 1.0 | 1.0 | 1.06 | 1.0 | 1.0 | 1.0 |
| Curing agent (t-butyl peroxybenzoate) (%) | 0.25 | 0.25 | 0.25 | 0.25 | 0.27 | 0.25 | 0.25 | 0.25 |
| Coloring agent (chrome yellow) (%) | 1.1 | 1.1 | 1.1 | 1.1 | 1.2 | 1.1 | 1.1 | 1.1 |
| Thickener (magnesium oxide) (%) | 0.14 | 0.14 | 0.14 | 0.14 | 0.27 | 0.25 | 0.25 | 0.25 |
| Viscosity of resin composition (poise) | 1350 | 1350 | 1350 | 1350 | 1350 | 1350 | 1350 | 1350 |
| Chopped glass fiber strands | | | | | | | | |

TABLE 1-continued

| Item | Example | | | | Control | | | |
|---|---|---|---|---|---|---|---|---|
| | 1 | 2 | 3 | 4 | 1 | 2 | 3 | 4 |
| Chopped fiber strand content (%) | 25.0 | 25.0 | 25.0 | 25.0 | 20.0 | 25.0 | 25.0 | 25.0 |
| Length of chopped glass fiber strands (mm) | 12 | 12 | 12 | 12 | 6 | 12 | 12 | 12 |
| Diameter of filament (μm) | 13 | 13 | 11 | 11 | 11 | 11 | 11 | 11 |
| Number of filament per strand (piece) | 800 | 800 | 800 | 1200 | 400 | 400 | 800 | 1600 |
| Amount of binder deposited (%) | 1.92 | 1.87 | 2.15 | 1.88 | 1.35 | 2.24 | 1.22 | 1.70 |
| Percentage of styrene monomer insoluble binder (%) | 50 | 80 | 70 | 68 | 29 | 65 | 29 | 68 |
| Impact strength | | | | | | | | |
| Compression molded piece (Kg cm/cm$^2$) | 29.6 | 29.0 | 27.6 | 27.3 | 19.8 | 35.4 | 30.7 | 27.1 |
| Injection molded piece (kg cm/cm$^2$) | 20.4 | 20.7 | 20.8 | 21.0 | 9.2 | 16.5 | 17.4 | 19.8 |

(Note 1)
The glass fiber strands used in control 1 were produced by Nippon Glass Fibers Co., Ltd. and marketed under trademark designation of "RES06BM."

INDUSTRIAL APPLICABILITY

The fiber-reinforced thermosetting resin molding material produced by the present invention can be injection or transfer molded with high productivity and without entailing damage to glass fibers. Thus, it permits manufacture of large molded products such as outer panels of automobiles possessing twice as high impact strength as those of the molded products of the conventional BMC and enjoying highly satisfactory surface qualities.

We claim:

1. In a molding material composed of a liquid thermosetting resin composition containing styrene monomer as a cross-linking component thereof and chopped glass fiber strands and intended to be molded by being forced into the interior of a die by the use of a plunger or a screw mechanism and compressed therein under application of heat, the improvement wherein
    said chopped glass fiber strands have deposited thereon a binder having a component insoluble in styrene monomer wherein the number of glass filaments used in said glass fiber strands falls in the range of 600 to 1,400 per strand,
    the amount of said binder is not less than 1.0% by weight, and
    the amount of said component insoluble in said styrene monomer falls in the range of 40 to 90% by weight of said binder.

2. A molding material according to claim 1, wherein said chopped glass fiber strands have a length in the range of 6 to 25 mm.

3. A molding material according to claim 1, wherein the content of said chopped glass fiber strands is in the range of 15 to 30% by weight.

4. A molding material according to claim 1, wherein the amount of said binder is in the range of 1.0 to 2.3% by weight.

5. A molding material according to claim 1, wherein the amount of said component insoluble in styrene monomer is in the range of 45 to 85% by weight, of said binder.

6. A molding material according to claim 5, wherein said chopped glass fiber strands have a length in the range of 12 to 18 mm.

7. A molding material according to claim 5, wherein the content of said chopped glass fiber strands is in the range of 15 to 25% by weight.

8. A molding material according to claim 5, wherein the amount of said binder deposited is in the range of 1.7 to 2.3% by weight.

9. A molding material according to claim 1, wherein said liquid thermosetting resin composition is an unsaturated polyester resin composition.

10. A molding material according to claim 1, wherein said molding material is a bulk molding compound.

11. A method for the production of a fiber-reinforced thermosetting resin molding material intended to be molded by being forced into the interior of a die by the use of a plunger or screw mechanism and compressed therein under application of heat, comprising
    mixing a liquid thermosetting resin composition containing styrene monomer as a cross-linking component with chopped glass fiber strands wherein the number of said fibers falls in the range of 600 to 1,400 per strand,
    said glass fibers having deposited thereon a binder having a component insoluble in styrene monomer wherein the amount of said binder is not less than 1.0% by weight, and
    the amount of said component insoluble in styrene monomer falls in the range of 40 to 90% by weight, of said binder.

12. A method according to claim 11, wherein said liquid thermosetting resin composition is an unsaturated polyester resin composition.

* * * * *